Aug. 4, 1959  A. B. SCHULTZ  2,898,280
FUEL ROD CLUSTERS
Filed July 29, 1953  4 Sheets-Sheet 1

INVENTOR.
Arthur B. Schultz
BY
Roland A. Anderson
Attorney.

Aug. 4, 1959 — A. B. SCHULTZ — 2,898,280
FUEL ROD CLUSTERS
Filed July 29, 1953 — 4 Sheets-Sheet 2
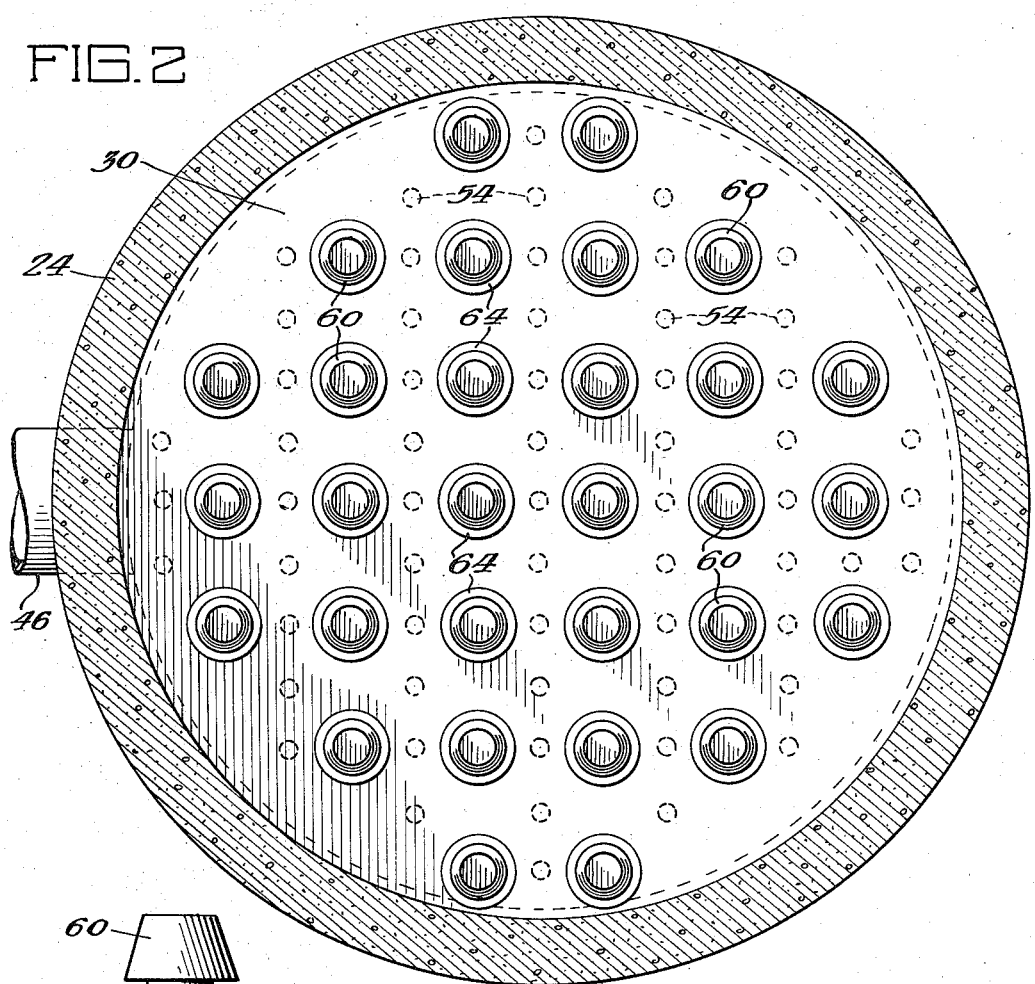
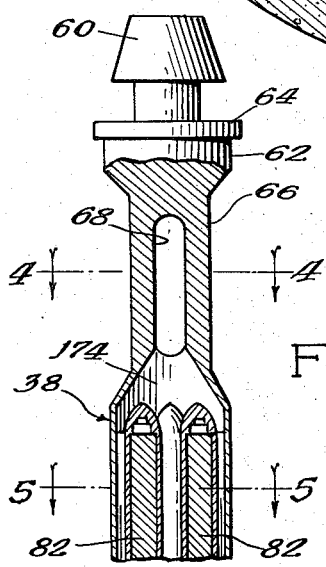
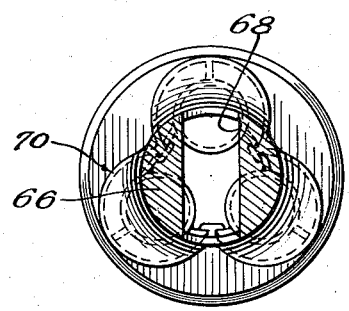
INVENTOR.
Arthur B. Schultz
BY
Roland A. Anderson
Attorney Aug. 4, 1959 A. B. SCHULTZ 2,898,280
FUEL ROD CLUSTERS
Filed July 29, 1953 4 Sheets-Sheet 3
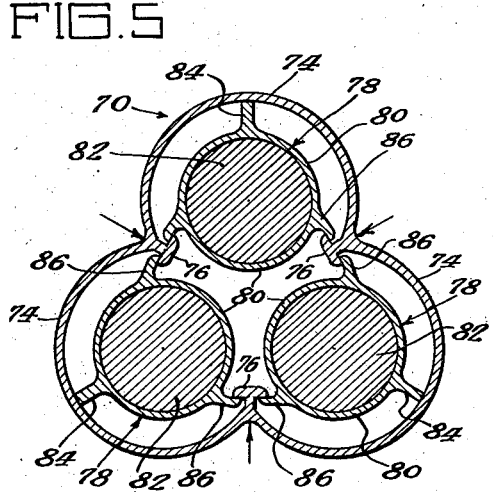
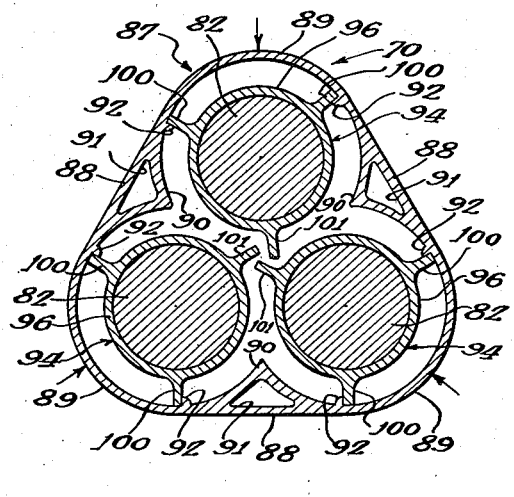
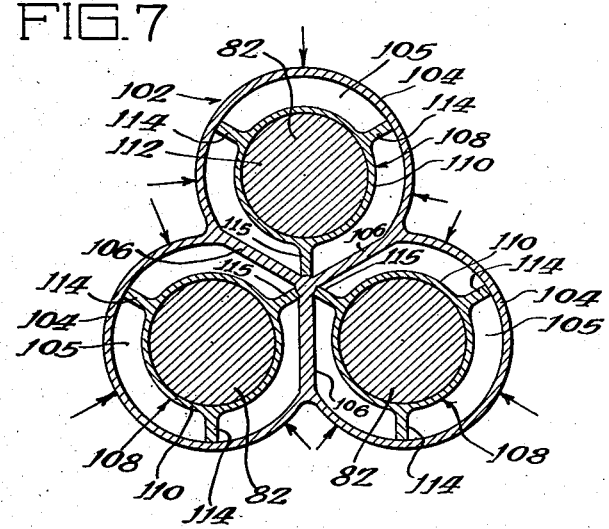
INVENTOR.
Arthur B. Schultz
BY
Roland A. Anderson
Attorney Aug. 4, 1959     A. B. SCHULTZ     2,898,280

FUEL ROD CLUSTERS

Filed July 29, 1953     4 Sheets-Sheet 4

INVENTOR.
Arthur B. Schultz
BY
Roland A. Anderson
Attorney

United States Patent Office 2,898,280
Patented Aug. 4, 1959

2,898,280

FUEL ROD CLUSTERS

Arthur B. Schultz, Western Springs, Ill., assignor to the United States of America as represented by the United States Atomic Energy Commission Application July 29, 1953, Serial No. 376,277

14 Claims. (Cl. 204—193.2)

This invention relates to a tubular heat exchanger and more specifically to the use thereof with fuel rods of a neutronic reactor.

When heat is exchanged between substances within and without a tube of a heat exchanger, it may be desirable to make the tube diameter relatively small. If the structure is relatively long, there is the problem of supporting the structure against bending. According to the present invention, the tubes of the structure are arranged in clusters that have the requisite stiffness to resist bending.

For special reasons that have to do with reactor theory and operation, it may be desirable to group fuel rods of a neutronic reactor in clusters and to incorporate them in a heat exchanger of the above type. For details of theory and essential characteristics of neutronic reactors, reference is made to the U.S. Patent of Fermi, et al., No. 2,708,656, Wigner et al. Patent 2,736,696, dated February 28, 1956, and Wigner et al. Patent 2,770,591, dated November 13, 1956.

In the drawings:

Fig. 2 is a horizontal sectional view taken on the line 2—2 of Fig. 1;

Fig. 3 is a fragmentary sectional view, partly in elevation, of the upper end of a fuel element;

Fig. 4 is a horizontal sectional view taken on the line 4—4 of Fig. 3;

Fig. 5 is a horizontal sectional view taken on the line 5—5 of Fig. 3, illustrating one form of construction of the fuel element; and Figs. 6 to 11, inclusive, are horizontal sectional views similar to Fig. 5 illustrating various modified forms of construction which the fuel element may take.

Figure 1:
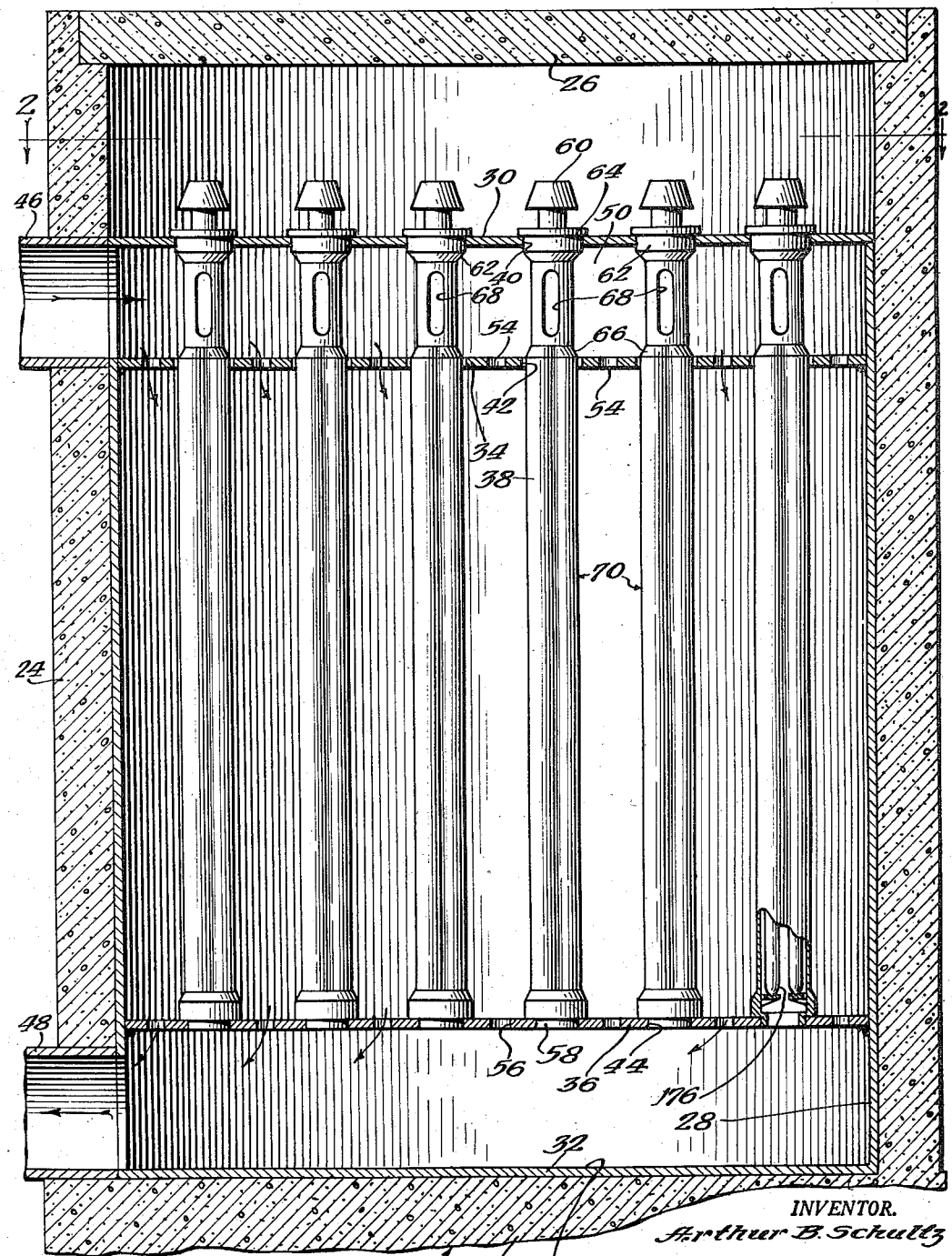
Fig. 1 is a vertical sectional view, partly in elevation, showing a number of fuel elements in a neutronic reactor.

Referring to Fig. 1, a neutronic reactor is generally indicated at 20, standing upon a base 22 and enclosed within a side wall 24 which is preferably cylindrical. Both the base 22 and the side wall 24 are composed of a neutron-shielding material, such as concrete. At the top of the side wall 24 is a cover 26 of similar material. The interior of the reactor side wall 24 is covered with a liner 28 which extends from the base 22 to a region near but spaced from the top of the side wall 24. At the top of the liner 28 is a horizontal top plate 30 which is attached at its periphery to the upper extremity of the liner in a fluid-tight manner, such as by welding. At the lower end of the liner 28 is a bottom plate 32 covering the base 22. Between the top plate 30 and the bottom plate 32 are disposed two plates 34 and 36. Both plates 34 and 36 are secured at their peripheries to the inner surface of the liner 28, the former plate being disposed a short distance below the top plate 30 and the latter plate being disposed a short distance above the bottom plate 32. Between the plates 34 and 36 is the so-called core of the reactor, the dimensions of which are approximately 15 feet between said plates and 15 feet in diameter.

As shown in Fig. 1, a plurality of elongated fuel elements 38 are disposed substantially vertically between the top plate 30 and the lower support plate 36 by which said rods are supported. For this purpose, the plates 30, 34 and 36 are provided with aligned apertures 40, 42 and 44, respectively, the number of each of which is equal to the number of fuel elements 38. In Fig. 2 the apertures 40 are shown disposed in a rectangular pattern on the top plate 30. However, the pattern may be different, such as hexagonal, depending upon the particular dimensions of the core of the reactor and upon the type and amount of fuel used in the fuel elements 38. By virtue of the apertures 40, 42 and 44, the fuel elements 38 may be inserted into their positions shown in Fig. 1 or removed therefrom by removing the cover 26. A detailed description of the fuel elements 38 will be given hereinbelow.

It was indicated above that this reactor is cooled and moderated by heavy water which is not shown in the drawings. For this purpose an inlet 46 is provided in the upper portion of the side wall 24, as shown in Fig. 1. In addition, an outlet 48 is provided at the lower end of the side wall 24 to carry away the heavy water after it has passed through the core of the reactor. The plates 30 and 34 and the liner 28 form an upper plenum chamber 50, which communicates with the inlet 46. The liner 28 and the plates 32 and 36 form a lower plenum chamber 52, which communicates with the outlet 48. As shown in Figs. 1 and 2, a plurality of apertures 54 are symmetrically disposed in the plate 34 among the larger apertures 42 hereinbefore described. In like manner a plurality of apertures 56 are disposed in the plate 36 among the larger apertures 44 in the manner shown in Fig. 2. The heavy water coolant, upon entering the upper plenum chamber 50, passes into the core of the reactor, completely filling the space around the fuel elements 38 and between the plates 34 and 36, and passes downwardly through the apertures 56 into the lower plenum chamber 52 from which it exits via the outlet 48.

Considering fuel elements 38 in greater detail, each element is internally cooled by the heavy water coolant. Accordingly, a given element 38 will be considered in two portions, namely, the portion disposed in the upper plenum chamber 50 and the portion extending through the core between the plates 34 and 36. When the fuel elements 38 are inserted into place as shown in Fig. 1, the lower end, which is provided with an annular flange 58, is seated within one of the apertures 44 in the plate 36, which are aligned with the corresponding apertures 40 and 42 in the upper plates 30 and 34, respectively. For the purpose of handling, each fuel element 38 is provided with a member 60, extending from and integral with the top of the element. In order to assure a satisfactory fit, each element 38 is provided with a round member 62, adapted to fit into the aperture 40. Above the member 62 is a flange 64 that is integral therewith and serves to support the element 38 in the position shown.

Below the round member 62 is a necked portion 66 extending to the plate 34, at which point the fuel elements again widen to a diameter slightly smaller than that of the aperture 42. The aperture 42 is large enough to permit the passage of the lower end of the element 38. A radial slot 68 extends entirely across the necked portion 66 from one side to the other. The purpose of the slot 68 is to provide a way for the heavy-water coolant into the interior of the fuel element 38. The coolant, after moving downwardly through the element 38, exits into the lower plenum chamber 52 through an open end provided at the lower extremity of the element within the annular flange 58. It is the primary purpose of the particular heavy water coolant passing through the interior of each fuel element 38 to serve as a coolant although it inevitably serves as a neutron moderator for fissionable material within each fuel element 38.

The present invention is concerned with various novel forms of construction the fuel element may take. These forms are illustrated in section in Figs. 5–11, each of which may be considered to be taken on the line 5—5 of Fig. 3. That portion of the fuel element within the core of the reactor 20 extending vertically therein has a casing.

In Fig. 5 the casing, generally indicated by the reference character 70, is a trefoil consisting of three similar curved circular portions 74 appreciably more than 180 degrees in extent and three T-shaped longitudinal projections or ribs 76 formed integral with the portions 74 and located on the interior of the casing. Within each portion 74 is an elongated fuel rod 78 comprising a fuel jacket 80 of corrosion-resistant material having low neutron-absorbent characteristics, such as aluminum or its alloys or zirconium or its alloys, and a body 82 of material containing an isotope fissionable by thermal neutrons, such as $U^{235}$, $U^{233}$, and $Pu^{239}$. Similar fuel bodies 82 are employed in other modifications to be described presently. Each jacket 80 is provided with three longitudinal external fins 84 of which a fin 84 engages a region of the interior of a casing portion 74 spaced from the projections 76 and fins 86 engage the ribs 76. The ribs 86 may be obliquely radial so as to engage the under sides of the heads of the projections 76. The fin 84 may be radial and may be spaced equally from the ribs 86. The casing portions 74 may be circular. Before insertion of each fuel rod 80 in the casing 70, the spacing of the ribs 86 is slightly less than that of the two casing projections 76 that the ribs 86 are to engage. Radially inwardly directed pressure is applied at the three junctures between the casing portions 74, as indicated by the arrows in Fig. 5, so that casing projections 86 are moved closer to one another. Now the fuel rods 80 are inserted in the casing 70, and the pressure on the casing is released. The casing projections 76 spring outward away from one another and press firmly against the ribs 86 and tightly hold the fuel rods 80 in the casing 70. The rib 84, by engaging the curved casing portion 74, keeps the jacket fins 86 against the casing ribs 76. The casing should have the above qualities of the jackets and also enough resilience to spring back to shape as aforesaid. An example of a material suitable for the casing is an alloy composed of 98.9% aluminum, 0.4% silicon, and 0.7% magnesium. Both the casing 70 and the jacket 80 may be formed by extrusion.

A second embodiment of the fuel element is indicated in Fig. 6 as having a casing 87 having three sides 88 and rounded corners 89 joining the sides. Centrally disposed on the inside of each side of the casing is a longitudinal protuberance 90 enclosing a channel 91. Between each protuberance 90 and each rounded corner 89 is a longitudinal rib 92. The sides of the protuberances 90 are arcuate generally on the same radius as the insides of the casing corners 89, so that protuberances 90 and the casing corners 89 form arcuate wall portions of appreciably more than 180 degrees extent. Within each set of arcuate wall portions is disposed a fuel rod 94 which consists of a jacket 96 and one of the bodies 82. Each jacket 96 is provided with two fins 100 and one fin 101 which extend outwardly and longitudinally of the jacket. The fins 100 are tightly engaged by the casing ribs 92, whereby the fuel rods 94 are securely held in the casing 87. The fins 101 project into the central region of the casing and reduce the size of the channel formed at the central region. Before assembly of the fuel rods 94 in the casing 87 the spacing of the casing ribs 92 at a given corner is less than that of the fins 100. Radially inwardly directed pressure is applied at the three rounded corners 89 of the casing as indicated by the arrows in Fig. 6, so that the corners move inwardly and the ribs 92 move outwardly, whereby at each rounded corner the ribs move away from one another. Now there is room for the fins 100 at the ribs 92, and the fuel rods 94 are inserted in the casing. Thereafter the pressure against the corners 89 of the casing 87 is released, and the ribs 92 move toward one another, gripping the fins 100 so as to hold the fuel rods 94 in the casing 87. The casing ribs 92 prevent each fuel rod from moving in one direction relative to the casing 87. The fuel rod cannot move in the opposite direction, since the portion of the corner 89 between the ribs 92 is shaped to hold the jacket fins 100 against the ribs 92. The casing 87 and the jackets 96 may have the same compositions, respectively, as the casing 70 and jackets 80 of Fig. 5. The casing 87 and the fuel rods may be formed by extrusion.

In Fig. 7 a third embodiment of the fuel element has a casing 102 which has the same external shape as the casing 70 of Fig. 5, i.e., is formed of three curved portions 104 of appreciably more than 180 degrees extent. Internally there are three tubular passageways 105 which are formed by the three curved portions 104 and three partitions 106 which extend radially from the center of the casing 102 to the junctures of the arcuate portions 104. The arcuate portions and the partitions are integral, and the casing is preferably fabricated by an extrusion process. Within each passageway 105 is disposed a fuel rod 108 consisting of a jacket 100 and one of the bodies 82. Integral with and extending outwardly from the jacket 110 are two fins 114 and one fin 115. The fins extend longitudinally of the jacket and are spaced from one another about the jacket. The fins 114 engage the interior of the arcuate portion 104, and the fin 115 engages the common juncture of the partitions 106 with one another. Before assembly of the fuel rods 108 in the casing 102 the spacings between the ends of the fins 114 and 115 are slightly greater than the spacings between the portions of the casing 102 engaged by the fins. When the fuel rods are to be inserted in the casing, inwardly directed pressure is applied at three regions of each curved portion 104, as indicated by the arrows in Fig. 7, so as to increase the spacings between the aforementioned portions of the casings, and the fuel rods 108 are inserted. Release of pressure against the casing 102 causes the same to return to its original form and to grip the fuel rods 108 at their fins 114 and 115. The casing 102 and the jackets 110 may have the same compositions, respectively, as the casing 70 and the jackets 80 of Fig. 5. The casing 102 and the fuel rods 78 may be formed by extrusion.

Figure 8:
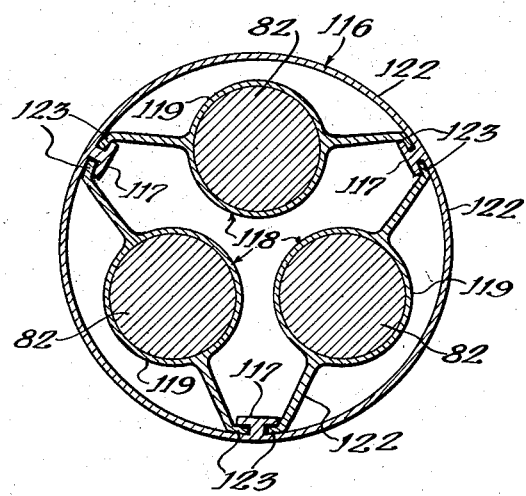

The remaining casings to be described (Figs. 8–11) differ from the foregoing in that each of the remaining is shaped like a single simple and complete curved figure such as a circle. In Fig. 8 a casing 116 has three longitudinal T-shaped ribs 117 equally spaced on the interior thereof and integral therewith. Three fuel rods 118 are mounted within the casing and have jackets 119 and bodies 82. Each jacket 119 is provided with oppositely disposed longitudinal fins 122. The end of each fin 122 is bent as indicated at 123 in order to be insertable beneath a head of a rib 117. The ribs 117 are swaged outwardly against the fin ends 123 so as to clamp them against the interior of the casing 116. Thus the fuel rods 118 are secured to the casing. The casing 116 and the jackets 119 may have the same compositions, respectively, as the casing 70 and the jackets 80 of Fig. 5. The casing 116 and the fuel rods 118 may be formed by extrusion.

Figure 9:
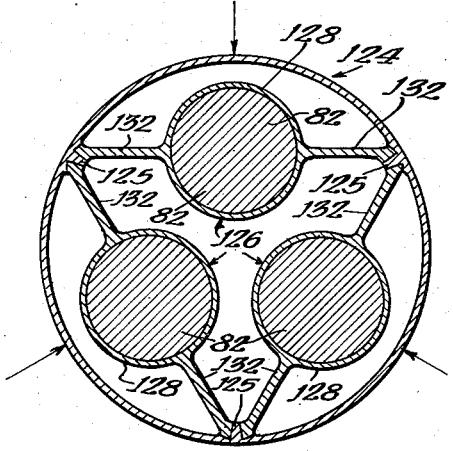

In Fig. 9 a casing 124 has three internal equally spaced longitudinal ribs 125. Slight grooves or depressions are formed internally of the casing 124 at the sides of each rib 125. Within the casing 124 are three fuel rods 126 each consisting of a jacket 128 and one of the bodies 82. Each jacket 128 is provided with two oppositely disposed fins 132 which have slightly enlarged obliquely cut ends that engage the sides of the ribs 125 and the grooves at the sides of the ribs. Before insertion of the fuel rods 126 in the casing 124, the spacing between the ribs 125 and between the grooves is slightly less than the distances between the outer extremities of the jacket fins 132, so that the fuel rods 126 will be tightly gripped at the fins 132 by the casing 124 and will thus be tightly held in the casing. Radially inwardly directed forces are applied at three regions midway between the ribs 125 as indicated by the arrows in Fig. 9, so that the portions of the casing 124 at the ribs 125 move outwardly, thereby increasing the spacing between the ribs sufficiently to permit insertion of the fuel rods 126 in the casing 124. The casing 124 and the jackets 128 may have the same compositions, respectively, as the casing 70 and the jackets 80 of Fig. 5. The casing 124 and the fuel rods 126 may be formed by extrusion.

Figure 10:
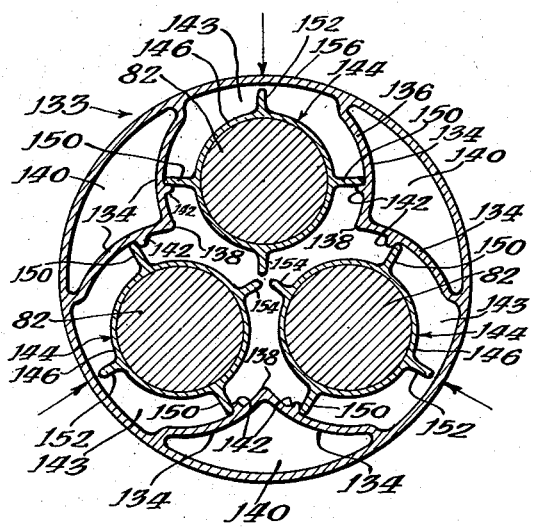

In Fig. 10 a casing 133, exteriorly shaped like the casings 116 and 124 in Figs. 8 and 9, has three sets of internal curved walls 134 formed integral with the casing. The walls of each set meet at an apex 138 and form with the portion of the casing 133 proper lying between them a channel 140 through which cooling liquid is to be circulated. The walls 134 are exteriorly concave and each has an exterior longitudinal rib 142. The sets of walls 134 are equally spaced from one another and form with the portions of the casing 133 proper between the sets three longitudinal channels 143. Within each channel 143 there is a fuel rod 144 consisting of a jacket 146 and one of the bodies 82. The fuel rods are mounted in position by means of two oppositely extending fins 150 which are formed integral with the jackets 146 and engage the interior walls 134 alongside the ribs 142 thereon. In addition, the fuel rods 144 are provided with outwardly directed fins 152 which terminate a short distance from the casing 133 and inwardly directed fins 154 which extend to a central region within the casing where they terminate in somewhat spaced relation to one another. The fins 150, 152, and 154 aid the transfer of heat with respect to the fuel rods 144. The fins 152 and 154 are shorter than the fins 150. The fins 154 reduce the size of the channel formed at the center of the casing. Before the fuel rods 144 are inserted in the casing 133, the spacing between the walls 134 of one set and the facing wall 134 of the next set alongside the ribs is slightly less than the distance between the ends of the ribs 150. Inwardly directed pressure is applied at three equally regions of the casing 133 as indicated by the arrows in Fig. 10 to distort the casing and increase the spacing between the sets of walls 134, and the fuel rods 144 are inserted in the casing 133. When pressure against the casing is released, the walls 134 grip the ends of the jacket fins 150 and hold the fuel rods 144 securely. The spacing illustrated in Fig. 10 between the ends of the fins 152 and the casing 133 permits the jacket to be distorted as aforesaid. The spacing between any two walls 134 that engage the fins 150 of a given fuel rod 144 decreases in the direction away from the fins 150 on the side away from the ribs 142, and thus these walls 134 keep the fins 150 against the ribs 142. The casing 133 and the jackets 146 may have the same compositions, respectively, as the casing 70 and the jackets 80 of Fig. 5. The casing 133 and the fuel rods 144 may be formed by extrusion.

Figure 11:
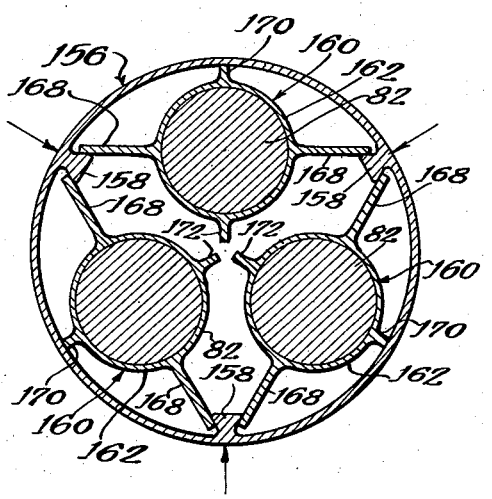

In Fig. 11 a casing 156, exteriorly shaped like the casings 116, 124, and 133, is provided with three ribs 158 equally spaced about the inside surface of the casing. The ribs extend longitudinally of the casing and increase in width when considered in an inward direction from the casing. Three fuel rods 160 are disposed within the casing. Each rod consists of a jacket 162 and one of the bodies 82. Each jacket is provided with two relatively long longitudinal fins 168 which extend in opposite directions, a relatively short longitudinal fin 170 which extends radially outward of the casing 156, and a relatively short longitudinal fin 172 which extends radially inward of the casing. The fins 170 and 168 are so related to the ribs 158 that when an attempt is made to insert a fuel rod 160 in the casing 156 when undistorted, contact of the fin 170 with the inside of the casing 156 will cause the ends of the fins 168 to strike ribs 158. Consequently, the casing 156 is distorted by radially inwardly directed pressure applied externally of the casing at the three ribs 158 as indicated by the arrows in Fig. 11 so that the fins 168 can clear the ribs 158. After the three fuel rods 160 have been inserted, the aforesaid distorting pressure on the casing 156 is released, and the ribs 158 move outwardly against the fins 168, thereby securely holding the fuel rods 160 in the casing 156. As indicated in Fig. 11, there is clearance between the ends of the fins 168 and the interior of the casing 156 at the sides of the ribs 158, so that the casing can be distorted as stated without interfering with the ends of the fins when the inserting operation is being carried out. The fins 172 extend near one another into a central region in the casing 156 so as to reduce the size of a center channel in the casing. Each jacket fin 170, by engaging the casing 156, holds the associated fins 168 against the casing ribs 158. The casing 156 and the jackets 162 may have the same compositions, respectively, as the casing 70 and the jackets 80 of Fig. 5. The casing 156 and the fuel rods 160 may be formed by extrusion.

In the various embodiments of fuel-rod clusters described it is contemplated that the fuel rods and the casings will be relatively long in comparison to their thicknesses or diameters. Thus the problem of accurately shaping the fuel rods and casings so that they will securely be held together when assembled arises, for their great lengths cause them to distort, rendering ineffective any accurate shaping of the parts. In the modifications of Figs. 5, 6, 7, 9, 10, and 11 I have assembled the fuel rods in a distorted casing and utilized the tendency of the casing to return to its undistorted condition to make the casing grip the fuel rods securely. In the modification of Fig. 8 I have utilized a special shaping operation after assembly to hold the fuel rods securely in the casing.

The upper ends and the lower ends of the fuel rods of all the modifications are capped as indicated, respectively, at 174 in Fig. 3 and 176 in Fig. 1, so that the fissionable bodies 82 are completely enclosed and protected from the coolant. The caps may be formed of the same material as the jackets.

In the various modifications described the fissionable bodies 82 may be omitted from the jackets, and the jackets become tubes that may conduct a liquid from which heat is to be abstracted by the coolant outside the tubes and within and outside the casings. The caps will be omitted from the jackets so that the liquid to be cooled may flow into the tubes at one end and out of the tubes at the other end. The tubes will be attached to suitable pipes, fittings, or headers so that the liquid within the tubes is kept from mixing with the coolant ouside the tubes.

The intention is to limit the invention only within the scope of the appended claims.

What is claimed is:

1. An assembly comprising a tubular casing having a plurality of internal ribs, and at least three elongated tubes extending longitudinally within the casing, each tube having a plurality of fins extending toward the casing, two of which fins engage the ribs adjacent the casing for holding each tube in spaced relation to the interior thereof.

2. A heat exchanger comprising a tubular casing having a plurality of internal ribs, and three elongated tubes extending longitudinally within the casing, each tube having two fins extending toward the casing, the ends of the fins engaging the ribs and supporting the tube by a compressive force exerted by the ribs on the fins whereby each tube is held in spaced relation to the interior of the casing.

3. A heat exchanger comprising a tubular casing having a plurality of internal ribs, and three elongated tubes extending longitudinally within the casing, each tube having four fins extending toward the casing, two of said fins being longer than the others and engaging the ribs and supporting the tube by a compressive force exerted by the ribs whereby each tube is held in spaced relation to the interior of the casing.

4. A heat exchanger comprising a tubular casing having three internal ribs equally spaced, and three elongated tubes extending longitudinally within the casing, each tube lying between two ribs in spaced relation thereto and having three fins extending to the casing, the ends of two of said fins contacting corresponding ribs on the side of the ribs nearer the third fin.

5. A heat exchanger comprising a tubular casing having six internal ribs, and three elongated tubes extending longitudinally within the casing, each tube lying between two ribs in spaced relation thereto and having two fins extending to the casing, each end of each fin fitting snugly between one side of a rib and the region of the casing directly adjacent thereto, the said tubes being held in spaced relationship within the casing by compressive forces exerted by the ribs on the fins.

6. A heat exchanger comprising a tubular casing having three sections joined in a trefoil and T-shaped internal ribs located at the junctures of the sections, three tubes each extending longitudinally within a section of the casing and having three external fins, one of said fins contacting the particular section, two of said fins engaging the under sides of the heads of the ribs at the junctures of the particular section with the other sections, the ribs exerting a compressive force against the said two fins and forcing the said one fin against the particular section.

7. A heat exchanger comprising a tubular casing having three sides and rounded corners, an internal rib on the casing near the position where the sides and corners meet, and three tubes extending longitudinally within the casing, each tube having three fins, one of said fins being located near the central region of the casing, two of said fins engaging corresponding ribs and being held in position by a compressive force exerted by the ribs for holding each tube in spaced relation to the interior of the casing.

8. A heat exchanger comprising a tubular casing having a plurality of internal partitions extending from a common control juncture, and a trefoil cross section formed of three portions within the casing which are separated by the partitions extending from the central region of the casing to the junctures of the portions, and a tube located within each portion of the casing and having three equally spaced external fins extending to the casing and to the central juncture of the partitions the tube being held by a compressive force exerted by the casing on the fins.

9. A heat exchanger comprising a tubular casing having three internal ribs of T-shaped cross section, and three tubes extending longitudinally within the casing, each tube having two fins, each end of each fin being engaged between the head of the rib on one side and the casing whereby the ends are held by a compressive force exerted by the ribs for holding each tube in spaced relation to the interior of the casing.

10. A heat exchanger comprising a tubular casing having three internal ribs equally spaced, and three tubes extending longitudinally within the casing, each tube having two external fins, the end of each fin fitting snugly between one side of a rib and the region of the casing directly adjacent thereto, where the fins are held by a compressive force exerted by the ribs for holding each tube in spaced relation to the interior of the casing.

11. A heat exchanger comprising a tubular casing having three internal support members each including two curved walls integral with the casing and joined with one another to form an apex, each wall having a rib, and three tubes extending longitudinally within the casing, each comprising a body composed of material containing isotopes fissionable by thermal neutrons, a jacket enclosing said tube having four fins, one of which extends to a point near the casing, another of which extends to a central region of the casing, and the remaining two of which extend to corresponding ribs on the sides of the ribs remote from the apex, said fins being held by a compressive force exerted by the ribs for holding each tube in spaced relation to the interior of the casing.

12. A heat exchanger comprising a tubular casing having three internal ribs equally spaced, each rib having a triangular cross section with one corner attached to the casing, and three tubes extending longitudinally within the casing, each tube having three longitudinal fins, one of said fins extending to the casing, the other two fins extending to and contacting two ribs on the sides thereof toward the casing in spaced relation to regions of the casing directly adjacent said ribs and being held by a compressive force exerted by the ribs for holding each tube in spaced relation to the interior of the casing.

13. A fuel element for a neutronic reactor comprising an elongated casing having a plurality of internal ribs, and a plurality of elongated fuel rods extending longitudinally within the casing, each rod comprising a body formed of material containing an isotope fissionable by thermal neutrons and a jacket containing said body and having external fins extending toward the internal ribs of the casing for holding the rod in spaced relation to the interior thereof by means of compressive forces exerted on the fins by the ribs.

14. The fuel element of claim 13 in which the casing is formed of an alloy composed of 98.9% aluminum, 0.4% silicon, and 0.7% magnesium, the jackets are formed of aluminum, and the isotope contained in the bodies is a material selected from the group consisting of $U^{233}$, $U^{235}$, and $Pu^{239}$.

References Cited in the file of this patent

UNITED STATES PATENTS

| | | |
|---|---|---|
| 1,256,116 | Dempsey | Feb. 12, 1918 |
| 1,511,056 | Ercanbrack | Oct. 7, 1924 |
| 1,739,137 | Gay | Dec. 10, 1929 |
| 2,017,676 | Von Girsewald et al. | Oct. 15, 1935 |

OTHER REFERENCES

Walker et al.: "Nucleonics," March 1952, pages 58–60.